INVENTORS J.A. BALDWIN, JR
A.H. BOBECK
BY
William H. Kamstra
ATTORNEY

United States Patent Office 3,434,125

Patented Mar. 18, 1969

3,434,125

MAGNETIC INFORMATION STORAGE CIRCUITS

John A. Baldwin, Jr., Fullerton, Calif., and Andrew H. Bobeck, Chatham, N.J., assignors to Bell Telephone Laboratories, Incorporated, New York, N.Y., a corporation of New York Original application May 18, 1960, Ser. No. 29,856, now Patent No. 3,182,296, dated May 4, 1965. Divided and this application Nov. 23, 1964, Ser. No. 413,219

U.S. Cl. 340—174 12 Claims

Int. Cl. G11b 5/44, 5/62

ABSTRACT OF THE DISCLOSURE

A magnetic memory element is formed at the intersection of two adjacent and orthogonally oriented conductive magnetic members. Coincident half-select currents applied to the members establish differently oriented remanent magnetization states in the facing portions of those members at their intersection. A full-select current applied to one of the members causes a readout signal to be induced in the other member with a polarity which is a function of the remanent magnetization orientation, and the readout is non-destructive if the readout drive is at radio frequency. In the latter case detection is accomplished by a phase discriminator. The formation of multiple elements is achieved by extending the conductive magnetic members to form a coordinate array of intercepting straps.

This application is a division of the copending application of J. A. Baldwin, Jr., et al., Ser. No. 29,856, filed May 18, 1960, now Patent No. 3,182,296. This invention relates to electrical information storage circuits and particularly to such circuits employing two-state magnetic cores as basic memory elements.

Magnetic devices such as toroidal magnetic cores, multiapertured magnetic structures, and the like, fabricated of magnetic materials displaying substantially rectangular hysteresis characteristics are well known in the information handling art as highly useful elements for the storage of binary information. When such elements are associated in coordinate array memory matrices the storage of large numbers of individual information bits is made possible. In the conventional modes of operation, remanent magnetic states representative of the two binary values are induced in the memory element comprising an information address by current pulses applied to energizing windings inductively coupled to the element. A write current pulse is applied to induce in the memory element the particular information-representative state desired. When the nature of a stored information character is to be determined, an interrogate current pulse is applied to an interrogate winding also coupled to the memory element to switch its magnetic state to opposite remanence. The interrogate pulse, which is of the same polarity for either of the binary bits, causes a complete flux excursion from one remanent point on the hysteresis loop of the element to the opposite remanent point for one of the binary values and drives the flux of the element further into saturation for the other binary value. A read-out signal induced in an output winding also coupled to the memory element as the result of a complete flux excursion is indicative of one of the binary values, and a negligible shuttle signal so induced will then be indicative of the other binary value as is also known. In memory matrices where large numbers of individual memory elements are associated together, selective access for writing and interrogating purposes is readily accomplished by known coincident current energizing techniques so that information may be processed either on an individual character basis or on a group basis.

In the conventional information handling practice contemplated in the foregoing, a magnetic memory element serves only the function of storing a binary bit of information. Thus only its ability to retain a magnetic state once it is induced therein and to be switched to the opposite state is utilized. All of the magnetomotive drives necessary to accomplish the writing and interrogation operations are provided by fields generated by current pulses applied to externally coupled windings. For this purpose a number of coupled windings are generally required to selectively accomplish these operations. In a departure from known conventional memory elements the memory element itself may advantageously serve as one of its energizing means. One such element capable of performing this dual function is described, for example, in the patent of A. H. Bobeck, No. 3,083,353, issued Mar. 26, 1963, and comprises an electrically conducting magnetic wire having a helical flux path axially coincident therewith. Such a wire element in which flux changes are caused responsive to current pulses applied to the element itself for information handling purposes is also described in the patent of U. F. Gianola, No. 3,069,661, issued Dec. 18, 1962. Flux switching for writing and interrogating purposes may be accomplished in such a wire memory element by applying energizing current pulses to the wire memory element itself. Read-out signals are then also detected across the ends of the wire memory itself during an interrogation operation. The advantages of such a memory element arrangement in terms of considerations such as power requirement, circuit simplicity, ease of fabrication and the like, will be readily apparent to one skilled in the art.

It will be appreciated from the manner of interrogating magnetic memory elements to determine the nature of the information stored therein, that at least for one of the binary values, the information is destroyed in the process of its interrogation. Thus, if a memory element responds to an interrogating current pulse by switching its magnetic remanent flux state, the storage therein of one of the binary values, say a binary "1," is indicated. In this interrogating flux switching operation however, the memory element is caused to assume the remanent flux state corresponding to the other binary value, in the case of the example, that of a binary "0." Generally, it is thus necessary to provide some means of restoring information to the memory element in which it was stored after each interrogation if permanence of storage is required. Such a restoration operation manifestly entails additional circuitry which may frequently be complicated and is always a source of additional cost.

It is an object of this invention to provide a new and novel magnetic memory matrix which is simpler to fabricate and assemble and will be more economical than magnetic memory arrangements heretofore known.

Another object of this invention is the magnetic storage of binary information in a manner such that read-out signals of opposite polarity are generated responsive to an interrogation to indicate the storage of the two binary values.

Still another object of this invention is the nondestructive interrogation of magnetic memory elements in magnetic information storage matrices.

The foregoing and other objects of this invention are realized in one specific illustrative embodiment thereof comprising a pair of electrically conducting magnetic strips or tapes arranged at right angles and in inductive coupling with each other. The tapes, one of which may be designated the X coordinate tape and the other the Y coordinate tape, are electrically insulated from each other and are fabricated of a magnetic material capable of assuming stable remanent flux states. The facing areas of the two strips at their intersection define a single information bit address and magnetic flux states in the two strips at these areas determine the information values stored.

During a read-out phase of operation, an interrogating current pulse is applied to the X coordinate tape with the result that magnetizations are induced in its entire length which are in a direction at right angles to its longitudinal axis. Since the X coordinate tape is a conductor, such magnetizations follow from the magnetic field generated by the interrogate current pulse applied to the tape itself. This same interrogate field also induces in the intersecting area of the Y coordinate tape at the information address a magnetization which is in the same direction but along the longitudinal axis of the Y coordinate tape. This magnetic polarization is designated the normal or cleared state of the information address of the memory element being generally described. The basic memory element of this invention is advantageously adapted for word-organized memory matrices employing coincident current operation to achieve selective write-in. Accordingly, to write a particular binary information value in the address formed by the intersection of the two magnetic tapes, current pulses of the appropriate polarities are coincidentally applied to both the X and the Y coordinate tapes. As a result, magnetic fields are generated around the two intersecting tapes for their entire lengths with particular effects on the magnetizations already present in the tapes. The coincident currents are, in accordance with conventional practice, of half-select magnitude, that is, of insufficient magnitude alone to cause a flux switching in either of the tapes. However, their combined magnitude is determined to be sufficient to cause a complete flux excursion from one remanent point on the hysteresis loop of the material of which the tapes are fabricated to a point of opposite saturation. The result of the applied coincident write current pulses is thus to leave the flux states of the tapes at points other than their intersection effectively undisturbed. At the intersecting areas of the X and Y coordinate tapes constituting the information address, on the other hand, the generated write fields combine to produce a resultant switching magnetomotive force sufficient to cause a new alignment of the magnetizations in the two tapes. Since the fields are at right angles to each other, the resultant field is operative to induce remanent magnetizations in a direction from one quadrant of the information address area of each tape to the opposite such quadrant for a particular information value. The particular directions of the resultant remanent magnetizations will depend upon the polarity of the coincident write current pulses which in turn will be determined by the particular information value to be written in an information address. The extent of the magnetizations in the tapes and their particular alignments will be considered in detail in the detailed description of a specific embodiment of this invention which follows.

In a subsequent read-out phase of operation an interrogating current pulse of full-select magnitude is applied to the X coordinate tape alone. As a result, the remanent fluxes at the information address areas are switched from the information-bearing diagonal alignment to one at right angles to the longitudinal axis of the X coordinate tape and along the longitudinal axis in the Y coordinate tape. The flux changes in each of the tapes, as the information address reassumes its cleared remanent flux states, induce read-out voltages across the ends of each of the tapes. However, in the particular embodiment being generally considered only the read-out voltages appearing across the ends of the Y coordinate tape are utilized to signal the character of the information value stored in the interrogated address. Since binary information is represented by diagonal remanent magnetizations in either one of two directions, read-out signals of opposite polarities are generated during interrogation to indicate the presence of the two binary values. The advantages of such easily distinguished read-out signals will be readily appreciated. Thus no problems such as are encountered in more conventional prior systems are presented in which it is necessary to distinguish between a large read-out signal of one polarity indicative of one binary value and a smaller shuttle signal of the same polarity generated when the other binary value is interrogated.

The fact that in the embodiment the energizing current pulses are applied directly to the elements in which the information is also stored, completely eliminates the need for externally coupled windings. The many advantages of this construction and operation and the facilitation of assembly of large memory matrices and arrays afforded thereby are obvious. However, the principles of this invention are not limited to such a windingless construction. Thus, in specific system or circuit applications it may become advantageous to provide some form of external electrical conducting means in association with the X and Y coordinate tapes. In this situation electrically conducting, nonmagnetic strips or tapes may be laid flat on each of the crossed tapes to act as the current carrying media. Printed circuit techniques and related processes for depositing such electrically conducting components directly on the magnetic tapes may also be advantageously employed in this case.

The novel memory arrangement according to this invention and particularly the manner of information storage in the form of diagonally aligned flux states advantageously lends itself to nondestructive interrogation. Thus, by applying a radio frequency interrogating current to the X coordinate tape, either of the diagonal remanent magnetizations may be periodically rotated to a new angle from which it returns upon termination of the interrogating current. Read-out signals of alternating polarity are generated as a result across the ends of the Y tape for both binary information values. The two values may then be distinguished by their difference in phase by suitable phase discriminating circuitry.

In the foregoing only the crossed magnetic tape construction comprising a single binary bit address was considered to generally describe the principles of this invention. Manifestly such an element is ideally suited for extension to a coordinate array to constitute one or more planes of a multibit memory matrix. In such a matrix a plurality of X coordinate tapes may define a plurality of binary words, the individual corresponding characters of which are defined thereon by a plurality of Y coordinate tapes inductively coupled thereto at right angles. A large multiplane information storage matrix may be readily assembled by folding and refolding nonmagnetic carrier tapes of a Mylar material, for example, in which the magnetic memory tapes are embedded or otherwise affixed. In accordance with the principles of this invention only the two tapes interfolded together are required to form the complete memory portion of the matrix. Winding, threading, or otherwise coupling electrical conductors to this memory portion may thus be obviated; the access and output circuitry may be directly connected to the memory elements themselves.

It is thus one feature of this invention that a pair of electrically conducting magnetic tapes of a substantially rectangular hysteresis loop material are arranged in inductive coupling with each other substantially at right angles to define therebetween an information storage address. Magnetic fields generated around each tape combine to induce remanent magnetizations at particular diagonals representative of information values in the facing intersecting areas of the tapes.

It is another features of this invention that energizing currents may be applied directly to the magnetic memory elements themselves thereby precluding the necessity of providing complicated and often expensive external electrical wiring and windings.

Still another feature of this invention is the generation of read-out signals responsive to an interrogating current pulse across the ends of two magnetic tapes which are crossed to comprise an information storage element. Because of the novel manner of representing the two binary information values in the form of opposing diagonal magnetizations at the intersecting address areas of the tapes, read-out signals indicative of the storage of the two values are advantageously of opposite polarity.

According to yet another feature of this invention nondestructive interrogation of an information address is made possible by the novel manner of information storage. Thus the two facing areas of intersecting magnetic tapes are remanently magnetized in opposite diagonal directions for the two binary values. Momentary radio frequency rotations of the magnetizations from the diagonal alignments generate corresponding radio frequency signals across the ends of one of the tapes to indicate the presence in the address of the particular binary value. The latter are readily discriminated by their phase differences.

The principles of this invention together with other objects and features thereof will be better understood from the detailed description of illustrative embodiments thereof which follows when taken in conjunction with the accompanying drawing in which.

Figure 1A:
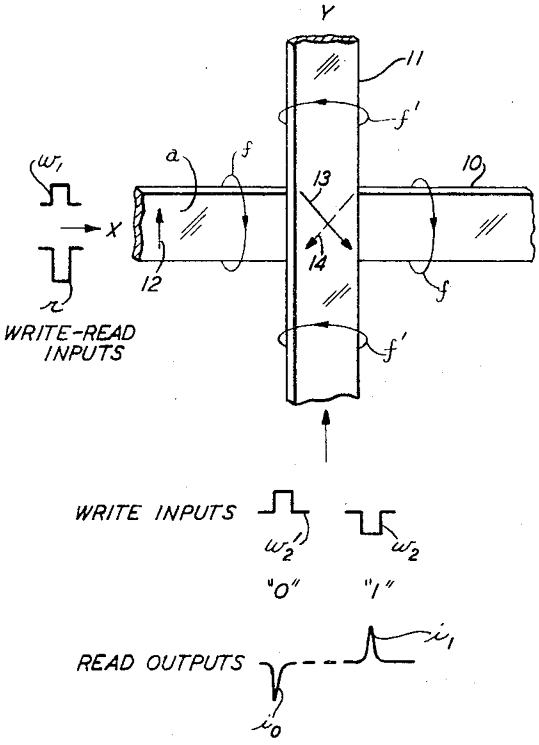
FIGS. 1A and 1B depict in plan and side views a simplified form of a single illustrative magnetic storage element according to the principles of this invention constituting an information address for one binary information value.
Figure 1B:
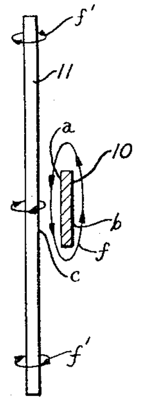

In FIGS. 1A and 1B are shown fragments of magnetic tapes arranged according to the principles of this invention to comprise a simple one-bit information storage element. A portion of an X coordinate tape 10 is disposed substantially at right angles with a portion of a Y coordinate tape 11 and in inductive coupling therewith. The tapes 10 and 11 are formed of an electrically conducting magnetic material exhibiting substantially rectangular hysteresis characteristics and are electrically insulated from each other. Materials such as are contemplated for the tapes 10 and 11 are well known in the magnetic storage art and may comprise, for example, the material known commercially as 4–79 Moly-Permalloy. The dimensions of the members of the storage element of FIGS. 1A and 1B have been exaggerated for purposes of description; however, dimensions of the order of 0.000125 inch for the thickness and 0.100 inch for the width of each of the tapes 10 and 11 provide adequate structural margins for the specific embodiments of this invention to be described.

In describing a typical write and interrogation operation of the storage element of FIGS. 1A and 1B, its magnetic state will be assumed as that immediately following an interrogation, which state will also correspond to the cleared state of the element. In the specific embodiment being described, interrogation is accomplished by applying a full-select negative current pulse $r$ to the X coordinate tape 10. As a result, remanent magnetizations are induced in the tape 10 in the side indicated by the face $a$ thereof in the direction represented by the arrow 12 in FIG. 1A. The opposite face $b$ of the tape 10 will manifestly be magnetized in the opposite direction from that represented by the arrow 12. These magnetic conditions will obtain along the entire length of the tape 10 and the field generated by the current pulse $r$ will also induce a magnetization in the direction of the arrow 12 in the Y coordinate tape 11 in the portion thereof indicated by the face $c$. The latter magnetization will be along the longitudinal axis of the tape 11 and will be induced only in that portion of the latter tape coming within the operative influence of the field generated by the current pulse $r$, that is, at the areas defined by the intersection of the tapes 10 and 11.

The tapes 10 and 11, and specifically the portions thereof defined by their intersection, are now in a cleared magnetic state and are prepared for the introduction therein of one or the other binary information value. The binary values are written into the storage element so far described by write current pulses coincidentally applied to the two tapes 10 and 11. The write current pulses are each of half-select magnitude; that is, each is of insufficient magnitude alone to cause a complete flux excursion from one remanent point on the hysteresis loop of the material of the tapes 10 and 11 to a point of opposite saturation. However, the total magnetomotive drive generated by the two half-select write current pulses is sufficient to cause such an excursion. Accordingly, when such a half-select current pulse is applied to the tape 10, the magnetomotive drive generated will be insufficient to cause a switching of the magnetizations of that tape from the direction indicated by the arrow 12 at portions thereof other than at the intersection of the two tapes. At the intersecting portions, however, the latter drive combines with the drive generated by the half-select pulse applied to the tape 11. The resultant drive is sufficient to cause a complete flux switching which in fact occurs as a result. However, since the fields produced by the two half-select write current pulses act at right angles the resultant field will be effective in opposing quadrants of the intersecting portions of the two tapes. Remanent magnetizations induced thereby at these portions in the tapes will accordingly also assume diagonal alignments, the particular directions being determined by the polarity of the applied half-select write current pulses.

The writing of a binary "1" will further serve to illustrate the operative principles generally described in the foregoing. This binary value is introduced into the illustrative storage element of FIGS. 1A and 1B by applying a positive half-select current pulse $w_1$ to the tape 10 coincidentally with a negative half-select current pulse $w_2$ applied to the tape 11 in the manner shown in the drawing. The fields generated by the latter current pulses are represented in FIGS. 1A and 1B by the lines of force $f$ and $f'$, respectively. At the intersecting portions of the tapes 10 and 11 defined by the areas of the opposing faces $a$ and $c$, however, the fields $f$ and $f'$ are added; and the vector sum of those fields switches the remanent magnetizations of the two tapes 10 and 11 at these areas in a diagonal direction represented in FIG. 1A by the arrow 13. The remanent magnetizations thus represented by the arrow 13 in the facing portions $a$ and $c$ of the tapes 10 and 11, respectively, bear the stored information, which, in the presently described case, is a binary "1." A single one-bit information address of the element so far described is thus defined by the facing intersecting portions of the crossed tapes 10 and 11 and, more specifically, the portions thereof defined by the facing areas $a$ and $c$. A binary "0" is introduced into the storage element of FIGS. 1A and 1B in a similar manner by reversing the polarity of one of the half-select write current pulses. Thus, although the polarity of the half-select write current pulse $w_1$ applied to the X coordinate tape 10 remains the same, the half-select write current pulse $w_2'$ is positive. The interaction of the fields produced by the write pulses $w_1$ and $w_2'$ is the same as that described for the writing of a binary "1" with the exception that the resulting remanent magnetization induced in the intersecting portions of the tapes 10 and 11 will lie along the opposite diagonal from that represented by the arrow 13. Thus the alignment of the remanent magnetizations for a binary "0" is that represented by the broken arrow 14 in FIG. 1A.

As has already been mentioned, during a subsequent interrogation phase of operation, a full-select negative read current pulse $r$ is applied to the X coordinate tape 10 alone. As a result of the magnetomotive drive generated thereby, the remanent magnetizations in both of the tapes 10 and 11 at their intersections are switched to the cleared magnetic states as previously described herein. As the information bearing diagonal magnetization in the tapes 10 and 11 are restored during interrogation, voltages will be generated across the ends of both of the tapes of polarities indicative of the information stored therein. The direction of rotation of the diagonal magnetizations for the two binary values will manifestly be in different directions as the interrogating magnetomotive drive is applied. Thus, as viewed in FIG. 1A of the drawing, the magnetizations represented by the arrow 13 will be rotated in a counterclockwise direction for a binary "1" and the magnetizations representative of a binary "0" symbolized by the arrow 14 will be rotated in the clockwise direction. As a result, a negative read-out signal will be generated across the ends of the Y coordinate tape 11 during interrogation indicative of the storage of a binary "0." A positive read-out signal will be so generated indicative of the storage of a binary "1." The latter read-out signals are shown in FIG. 1A by the signals $i_0$ and $i_1$, respectively. The particular interrogation operation thus described will be understood as being destructive. Thus, to achieve permanent storage of the binary values in this mode of interrogation, it is necessary to provide some manner of restoring the remanent magnetizations representative of these values to the storage element. Means for accomplishing this restoration operation are outside the scope of this invention. However, such means are known and have been widely utilized in conventional magnetic memory systems.

Figure 1C:
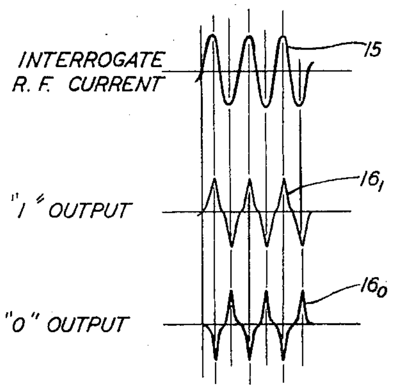
FIG. 1C shows in idealized form a graphical comparison of interrogating currents and read-out signals generated in a nondestructive mode of interrogating the storage element depicted in FIGS. 1A and 1B.

According to one feature of this invention, nondestructive interrogation of the storage element described in the foregoing may be accomplished by applying a radio frequency interrogating current to the X coordinate tape 10. This current may conveniently be of the frequency of the order of 5 megacycles and is shown in FIG. 1C by the waveform 15. As a result of the applied radio frequency alternating interrogating current, the diagonal remanent magnetizations represented in FIG. 1A by the arrows 13 and 14 are caused to rotate from their induced alignments by the momentary magnetomotive drives generated. The drives are not, however, sufficient to cause extensive flux excursions at the intersections of the tapes 10 and 11 and consequently the magnetizations return to their originally induced alignments after each alternation of the interrogating current. The periodic flux rotations thus caused at the information address generate corresponding read-out signals across the ends of the tapes 10 and 11. Since the rotations will be in opposite directions for the remanent magnetizations of the two binary information values as the result of an interrogating current of a particular polarity, the read-out signals generated will also be of opposite polarity at a given time of interrogation. This difference of polarity is manifested in a phase difference between the read-out signals for the two binary values as depicted in FIG. 1C by the read-out waveforms $16_1$ and $16_0$. Suitable phase discrimination circuitry will be readily envisioned by one skilled in the art for distinguishing between the two binary information representative read-out signals in this mode of operation.

Figure 2:
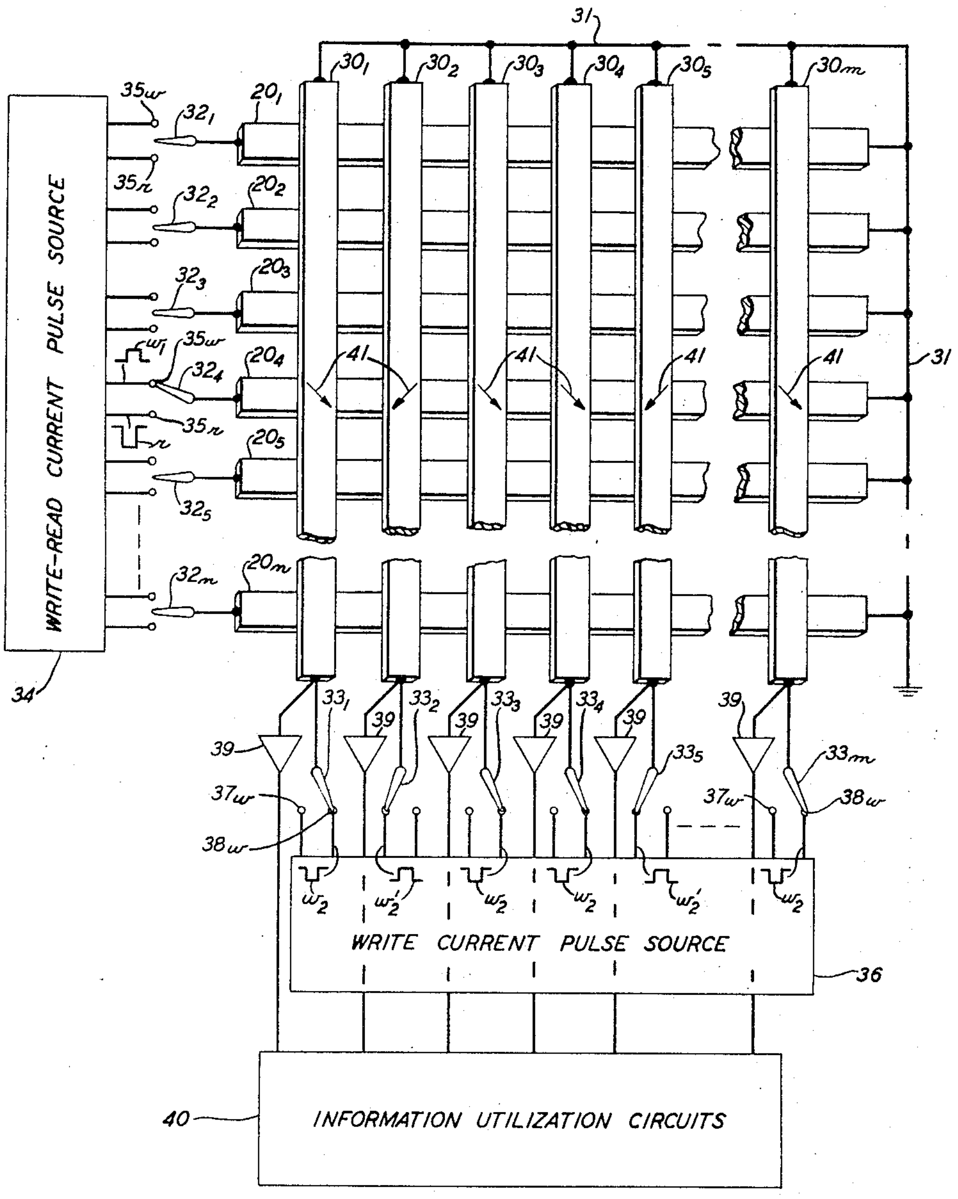
FIG. 2 depicts one specific illustrative coordinate array information storage matrix employing the storage elements of FIGS. 1A and 1B.

As depicted in FIG. 2, an information storage element according to the principles of this invention is readily adapted for extension to large scale coordinate memory matrices. The specific illustrative matrix shown in FIG. 2 comprises a plurality of X coordinate electrically conducting magnetic tapes $20_1$ through $20_n$ to which are inductively coupled at substantially right angles a plurality of similar Y coordinate tapes $30_1$ through $30_m$. The tapes 20 and 30 are electrically insulated from each other and define at their intersections a coordinate array of information addresses. The tapes 20 and 30 are also fabricated of a magnetic material exhibiting substantially rectangular hysteresis characteristics such as that described for the illustrative storage element of FIGS. 1A and 1B and may also be of the dimensions of the order there described. Each of the tapes 20 and 30 is connected at one end to a ground bus 31 and at the other end to a suitable switching means for selectively applying energizing current pulses of particular polarities to the tapes from external current pulse sources. The switching means are shown in FIG. 2 only in symbolic form as simple mechanical means. It will be appreciated that in practicing this invention such means will comprise electronic or other electrically actuated means having speeds of operation compatible with the access speed of the magnetic memory arrangement of this invention. Thus each of the tapes 20 is shown as connected to a switch wiper 32 and each of the tapes 30 is shown as connected to a switch wiper 33. The wipers 32 are adapted to be moved to either one of two contacts which in turn are connected to pairs of outputs of a write-read current pulse source 34. The latter current pulse source 34 may comprise any current source well known in the art capable of supplying bipolar current pulses of the character to be described hereinafter. Since such current sources are well known in the art and since their internal circuitry is not within the scope of this invention, they need not be described herein in detail and are shown only in block symbol form in FIG. 2.

One of each of the pairs of outputs of the current source 34 supplies a full-select negative read current pulse and its contact is designated $35_r$ in each case, and the other of the pairs of outputs of the source 34 supplies a half-select positive write current pulse, its contact being designated $35_w$ in each case. The wipers 33 are adapted to be moved to either of two contacts which in turn are connected to pairs of outputs of a write current pulse source 36. The latter source 36 may also comprise any current source well known in the art capable of providing bipolar current pulses of the character to be described hereinafter. Since such current sources as the source 36 are also readily devisable by one skilled in the art, they are also shown in FIG. 2 in block symbol form only and need not be described in further detail. One of each of the pairs of outputs of the current pulse source 36 supplies a positive half-select write current pulse and its contact is designated $37_w$ in each case; the other of the pairs of outputs of the source 36 supplies a negative half-select write current pulse, its contact being designated $38_w$ in each case.

Each of the Y coordinate tapes 30 is also connected at one end to an amplifying means 39, each of which amplifying means is in turn connected to information utilization circuits 40. The amplifying means 39 may also comprise well known, readily available amplifying circuits and the utilization circuits 40 may comprise work circuits capable of handling bipolar information-representative signals of the character generated by the storage elements according to this invention. The latter work circuits in the practice of this invention may comprise associated circuits of the system of which the memory matrix of FIG. 2 may advantageously comprise a part. Accordingly these circuits are also shown only in block symbol form in FIG. 2.

In describing an illustrative operation of the embodiment of FIG. 2, it will be assumed for purposes of description that the exemplary binary word 1 0 1 1 0 . . . 1 is to be written into and read from the word row defined by the X coordinate tape $20_4$. Accordingly, the wipers 33 associated with the Y coordinate tapes $30_1$, $30_3$, $30_4$ and $30_m$ are each moved to the contact $38_w$ and the wipers 33 associated with the Y coordinate tapes $30_2$ and $30_5$ are each moved to the contacts $37_w$. Simultaneously, the wiper $32_4$ associated with the selected X coordinate tape $20_4$ is moved to its contacts $35_w$. The wipers 32 and 33 are thus shown in FIG. 2 as resting in the positions for performing the present write operation. During the write interval a positive half-select write current pulse $w_1$ as described in connection with the embodiment of the FIGS. 1A and 1B, is applied from the source 34 via a contact $35_w$ and the wiper $32_4$ to the X coordinate tape $20_4$. Coincidentally with the pulse $w_1$ applied to the latter tape, half-select write current pulses of the proper polarity for writing the exemplary binary word are applied to the Y coordinate tapes 30. Thus positive half-select write current pulses $w_2'$ are applied from the source 36 via contacts $37_w$ and the switch wipers $33_2$ and $33_5$ to the Y coordinate tapes $30_2$ and $30_5$. At the same time negative half-select write current pulses $w_2$ are applied from the source 36 via the contacts $38_w$ and the switch wipers $33_1$, $33_3$, $33_4$, and $33_m$ to the tapes $30_1$, $30_3$, $30_4$, and $30_m$, respectively. The write current pulses $w_2'$ and $w_2$ are also of a character described in connection with the embodiment of FIGS. 1A and 1B. As a result of the half-select write current pulses thus applied, remanent diagonal magnetizations representative of the characters of the exemplary binary word are induced in the intersecting portions of the X and Y coordinate tapes 20 and 30 defining the information addresses of the exemplary word. These magnetizations and their directions are represented in FIG. 2 by the arrows 41. At the termination of the write operation of the word row $20_4$ the switch wipers 32 and 33 may be controlled to accomplish the writing of other binary words in other word rows. The control of the switching means symbolized by the wipers 32 and 33 will also be effected by associated circuitry of the information handling system of which the present invention may comprise a part and may be either on a sequential or a random basis. It should be noted that successive writing operations, in which other write current pulses are applied to the Y coordinate tapes 30, will leave the information previously written at other intersections undisturbed. The half-select write current pulses of either polarity applied to the latter tapes will be ineffective to cause a flux switching at the intersections of the X and Y coordinate tapes without the cooperation of coincident half-select write current pulses applied to an X coordinate tape.

Assuming that any desired subsequent write operations have been completed with respect to other word rows of the matrix, an interrogation operation may now be performed. This operation may also be described in connection with the information stored in the exemplary word row defined by the X coordinate tape $20_4$. The switch wiper 32 is moved to its contact $35_r$ of the output supplying a negative full-select read current pulse $r$. The latter current pulse is applied via the switch wiper $32_4$ to the X coordinate tape $20_4$ and is of sufficient magnitude to restore the diagonal remanent magnetizations of the word row to the cleared state. The flux changes thus resulting generate read-out voltage signals across the ends of each of the Y coordinate tapes $30_1$ through $30_m$ of polarities as determined by the direction of rotation of the magnetizations as they are restored to the cleared state. The readout signals will thus be indicative of the binary information values stored at the intersections of the X and Y coordinate tapes $20_4$ and $30_1$ through $30_m$ defining the information addresses of the binary word interrogated. These bipolar signals are transmitted to the amplifying means 39 where they are raised to suitable levels for utilization by the utilization circuits 40. By suitably controlling the switch wipers 32, the word rows may be interrogated sequentially or on a selective basis. It will be appreciated that the interrogation described in the foregoing is destructive. Accordingly, if permanent storage of the information values read out is required, rewrite circuitry may be employed to restore the information to a word row after each interrogation. However, such circuitry is readily devisable by one skilled in the art and since it does not comprise a part of the present invention a detailed description thereof need not be here provided. It is to be understood, however, that the nondestructive interrogation operation described in connection with the embodiment of this invention shown in FIGS. 1A and 1B may advantageously be applied to the embodiment of the FIG. 2. Thus it is only necessary to specify the write-read current pulse 34 source as providing radio frequency currents of the character described previously herein in connection with another embodiment to the output leads terminating in the contacts $35_r$. The amplifying means 39 or the information utilization circuits 40 may then also comprise circuitry capable of performing the phase discrimination operation necessary to distinguish between the two-phase information signals generated during this nondestructive interrogation.

Figure 3:
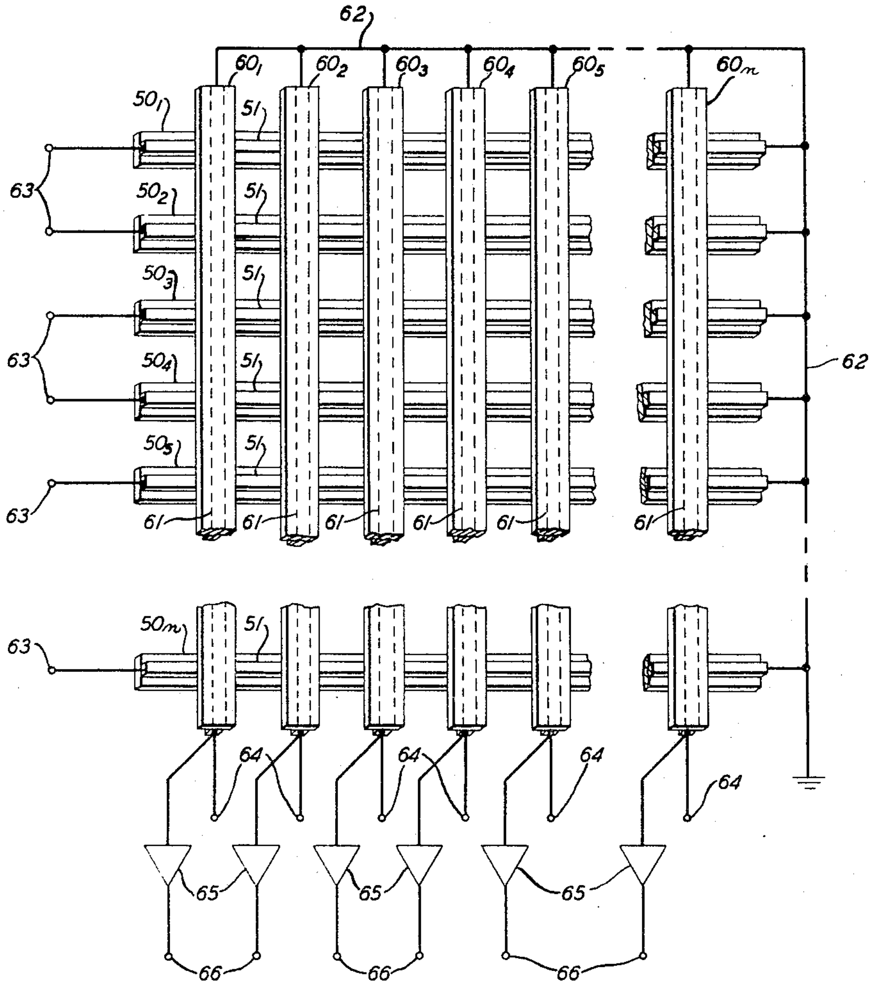
FIG. 3 depicts another illustrative coordinate array information storage matrix according to the principles of this invention.

In FIG. 3 is depicted another specific illustrative memory matrix according to the principles of this invention in which write and interrogating magnetomotive drives are applied by means of electrical conductors separate and distinct from the magnetic storage elements. This embodiment of the present invention comprises a plurality of X coordinate magnetic tapes $50_1$ through $50_n$ parallelly arranged substantially at right angles to a plurality of also parallelly arranged Y coordinate magnetic tapes $60_1$ through $60_m$. The tapes 50 and 60 are also fabricated of a magnetic material exhibiting substantially rectangular hysteresis characteristics but which material, as is apparent, need not be electrically conducting. Each of the tapes 50 has associated therewith in inductive relationship an electrically conducting nonmagnetic strip 51. In a similar manner, each of the tapes 60 has associated therewith, also in inductive relationship, an electrically conducting non-magnetic strip 61. The strips 51 and 61 are laid on or otherwise affixed to the near side of the magnetic tapes 50 and the far side of the magnetic tapes 60, respectively, as viewed in the drawing and are electrically insulated from each other and their associated magnetic tapes. In this position the strips 51 and 61 are disposed between the intersecting portions of the magnetic tapes 50 and 60 which portions, in this embodiment, also constitute the information addresses of the memory matrix. In this case the strips 51 and 61 are connected at one end to a ground bus 62. The strips 51 each have connected at their other ends an input terminal 63 and the strips 61 each have connected at their other ends an input terminal 64. Also connected to each of the other ends of the strips 61 is an amplifying means 65 having an output terminal 66.

The write and interrogation operations of the embodiment of FIG. 3 are identical to those described for the embodiment of FIG. 2. An appropriately poled half-select write current pulse is applied to a selected terminal 63 coincidentally with appropriately poled half-select write current pulses applied to the terminals 64 to accomplish write-in of a selected word row. Interrogation is performed by applying full-select interrogating current pulses to selected terminals 63. The magnetic fields generated by the write and interrogating current pulses in the strips 51 and 61 have the same magnetic effect on magnetizations in the magnetic tapes 50 and 60 as previously described for the embodiment of FIG. 2. Thus, the binary information values are represented in the information addresses by remanent magnetizations in the intersecting portions of the tapes 50 and 60 of particular diagonal directions which values are interrogated by their rotation to a cleared magnetic state. The strips 51 and 61 are thus added merely as current carrying members and do not change the principles of operation of this invention previously described in connection with the embodiment of FIG. 2. The nondestructive mode of interrogation described in connection with the latter embodiment is also applicable to the embodiment of FIG. 2. In the latter case suitable radio frequency current generating circuits and phase discriminating read-out circuits are then associated with the terminals 63 and 64 and the output terminals 66.

A simple, readily fabricated information storage arrangement is thus presented in accordance with this invention and one which obviously lends itself to machine assembly techniques. Although the embodiments which have been described have comprised specific coordinate arrangements, other physical configurations are also to be understood as falling within the scope of this invention. Thus, since it is only at the intersections of the magnetic information storage tapes that the magnetic drive fields cooperate to cause a flux switching or rotation, the alignment of the tapes need not be at right angles as understood in connection with the embodiments described. Nor, in the case when external conducting means are employed, need the electrically conducting strips follow the alignment of the magnetic storage tapes. In accordance with the principles of this invention, only an intersection of the conducting strips at the point where the magnetic storage tapes also intersect is a condition for practicing this invention. The magnetic drive fields for causing the setting and rotation of the remanent magnetizations in the information addresses may thus be generated by other physical alignments of the conducting and storage elements. One such other alignment, for example, may be one in which the electrical conducting strips are disposed substantially at right angles to each other but along diagonals of the magnetic storage tapes, which tapes are also arranged substantially at right angles to each other. Word rows are then defined by the conducting strips with the alignment of the storage tapes having no necessary relevance to the coordinately arranged information words and characters.

What have been described are thus to be understood as comprising only specific illustrative embodiments of the principles of this invention. Accordingly various and numerous other arrangements may be devised by one skilled in the art without departing from the scope of this invention. The features of this invention disclosed but not claimed herein are claimed in the aforementioned Patent 3,182,296 of J. A. Baldwin, Jr., et al.

What is claimed is:

1. An electrical information storage circuit comprising a first and a second magnetic tape having substantially rectangular hysteresis characteristics, said tapes being arranged in inductive coupling and intersecting each other to define information address portions therebetween, and energizing means for generating coincident circular magnetic fields of particular polarities around the longitudinal axes of said tapes to induce substantially diagonal magnetizations in said address portions of said tapes representative of particular information values, said energizing means including a first electrical conducting means inductively coupled parallel to said first magnetic tape and a second electrical conducting means inductively coupled parallel to said second magnetic tape.

2. An electrical information stoarge circuit according to claim 1 also comprising interrogating means including said first electrical conducting means for subsequently generating another circular magnetic field around the longitudinal axis of said first tape to rearrange said diagonal magnetizations in said address portions of said tapes, and means for detecting voltage changes across the ends of said second electrical conducting means.

3. An electrical information storage circuit according to claim 2 in which said energizing means also includes means for applying a first half-select current pulse to said first conducting means and means for applying a second half-select current pulse to said second conducting means coincidently with said first half-select current pulse, and in which said interrogating means includes means for applying a full-select interrogating pulse to said first conducting means.

4. A memory matrix comprising a plurality of first and second magnetic tape means, each of said tape means having substantially rectangular hysteresis characteristics, said first plurality of tape means being inductively coupled to said second plurality of tape means at an angle to define therebetween a coordinate array of information addresses, a plurality of first and second electrical conducting means inductively coupled to said first and said second magnetic tape means, respectively, means for applying a first half-select write current pulse to a selected conducting means of said first plurality of conducting means to generate a first magnetic field in one direction about the magnetic tape means associated with said selected conducting means, means for applying second half-select write current pulses of predetermined polarities to said second plurality of conducting means coincidentally with said first write current pulse to generate second magnetic fields in particular directions about each of said second plurality of magnetic tape means, resultant fields of said first and said second fields inducing remanent magnetizations in the magnetic tape means associated with said selected conducting means and in each of said second plurality of tape means at a selected coordinate of information addresses in particular directions representative of binary information values, means for subsequently applying an interrogating current pulse to said selected conducting means to cause a rotation of said remanent magnetizations, and means for detecting read-out voltage signals induced across the ends of said second plurality of conducting means.

5. An electrical information storage circuit comprising a first elongated magnetic member arranged in inductive coupling and at an angle with a second elongated magnetic member, each of said magnetic members having substantially rectangular hysteresis characteristics, facing portions of each of said members at the intersection thereof defining an information address, means for generating a first resultant write field for inducing substantially diagonal first magnetizations in one direction in each of said facing portions representative of one binary information value, said means comprising a first electrical conducting means inductively coupled parallel to said first magnetic member for generating a circular magnetic field around said first member, and a second electrical conducting means inductively coupled parallel to said second magnetic member for generating a circular magnetic field around said second member in one direction coincidently with said field around said first member; and means for also generating a second resultant write field for inducing substantially diagonal second magnetizations in another direction in each of said facing portions representative of the other binary information value including said first electrical conducting means for generating a circular magnetic field around said second member in the other direction coincidently with said field around said first member.

6. An electrical information storage circuit according to claim 5 also comprising interrogating means comprising means for applying an interrogating current pulse to said second electrical conducting means for rotating said first and said second magnetizations in one and the opposite directions and to generate a first read-out signal across the ends of said first electrical conducting means of one polarity indicative of one binary information value and a second read-out signal across the ends of said first electrical conducting means of the opposite polarity indicative of the other binary value.

7. An electrical information storage circuit according to claim 6 in which said interrogating current pulse is of a magnitude and frequency to rotate said first and said second magnetizations to new points on the hysteresis loops of said first and second magnetic members.

8. An electrical information storage circuit according to claim 6 in which said interrogating current pulse is of a magnitude and frequency to cause only a momentary rotation of said first and said second magnetizations from said substantially diagonal alignment.

9. An electrical information storage circuit according to claim 6 also comprising means for distinguishing between said first and said second read-out signals.

10. An information storage circuit comprising a first magnetic tape means, a first conducting means inductively coupled parallel with said first magnetic tape means, a plurality of second magnetic tape means arranged at an angle with said first magnetic tape means and in inductive coupling therewith, a plurality of second conducting means inductively coupled, respectively, parallel with said plurality of second magnetic tape means, said first magnetic tape means and said plurality of second magnetic tape means each having substantially rectangular hysteresis characteristics, said first magnetic tape means and said plurality of second magnetic tape means defining a plurality of information address portions on each of said first tape means and said plurality of second tape means at the intersections thereof, means for inducing substantially diagonal magnetizations in said first magnetic tape means and in said plurality of second magnetic tape means at said intersections thereof representative of particular binary information values, said means comprising said first conducting means for generating a first circular magnetic field around the longitudinal axis of said first tape means, and means comprising said plurality of second conducting means for generating second circular magnetic fields around the longitudinal axes of said plurality of second tape means coincidently with said first field.

11. An information storage circuit according to claim 10 also comprising interrogating means including said first conducting means for subsequently generating another circular magnetic field around the longitudinal axis of said first tape means to rearrange said diagonal magnetizations and means for detecting voltage changes across the ends of said plurality of second conducting means.

12. A memory matrix comprising a lattice of first magnetic strips crossed with second magnetic strips, each of said strips being of a material having substantially rectangular hysteresis characteristics, said first magnetic strips being inductively coupled to said second magnetic strips and defining an array of information address portions on each of said first and second strips at their crosspoints, an electrical conducting strip arranged parallel with each of said first and second magnetic strips and inductively coupled thereto, means for inducing magnetizations in the address portions of a selected one of said first magnetic strips and each of said second magnetic strips at their crosspoints representative of binary information values, said means comprising the electrical conducting strip arranged parallel to said selected one of said first magnetic strips and the electrical conducting strips arranged parallel to each of said second magnetic strips and means for applying coincident current pulses to said last-mentioned conducting strips to generate circular magnetic fields around the longitudinal axes of said last-mentioned first and second magnetic strips, means for applying an interrogating current pulse to the electrical conducting strip of said selected first magnetic strip to generate another circular magnetic field around the longitudinal axis of said last-mentioned magnetic strip to rotate said magnetizations, and means for detecting voltage changes across the ends of the electrical conducting strips of said second magnetic strips.

References Cited

UNITED STATES PATENTS

| | | | |
|---|---|---|---|
| 2,907,988 | 10/1959 | Duinker | 340—166 |
| 2,911,627 | 11/1959 | Kilburn | 340—166 |
| 3,069,661 | 12/1962 | Gianola | 340—174 |

TERRELL W. FEARS, *Primary Examiner.*

J. F. BREIMAYER, *Assistant Examiner.*